Jan. 5, 1965
W. LUTZ
3,164,213
SOIL CONDITIONING TOOL
Filed Oct. 1, 1962
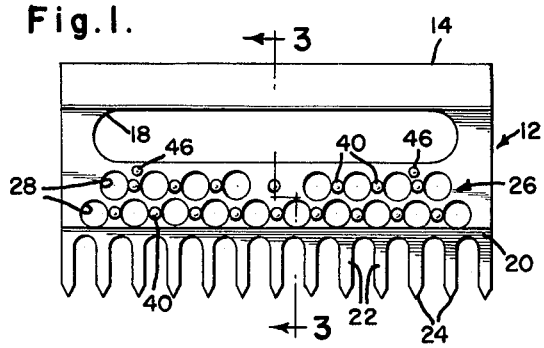
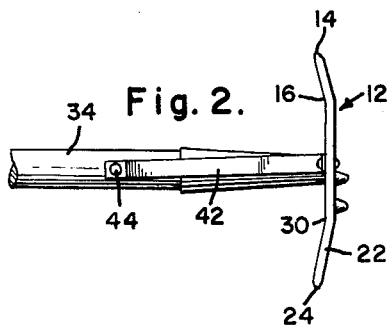
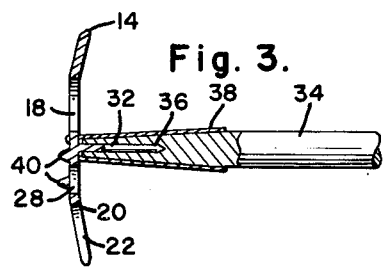
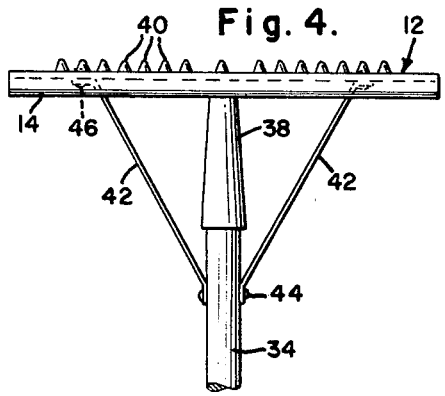
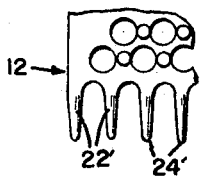
INVENTOR.
William Lutz
BY
*Townsend and Townsend*
*attorneys*

United States Patent Office 3,164,213
Patented Jan. 5, 1965

3,164,213
SOIL CONDITIONING TOOL
William Lutz, 3769 20th St., San Francisco, Calif.
Filed Oct. 1, 1962, Ser. No. 227,367
1 Claim. (Cl. 172—375)

This invention relates to a soil conditioning tool and more particularly a hand-held tool for preparing soil for planting.

Prior to planting seeds, bulbs or plants, it is usually necessary that weeds and roots be cleared from the area to be planted, and that the soil be loosened and smoothed. Prior art tools for this purpose of which I have knowledge, required the use of several different tools, none of which was entirely satisfactory for the task.

Therefore, it is an object of the present invention to provide a soil conditioning tool that is hand-held and can perform all the various tasks required in conditioning soil for planting. This object is realized in the present invention by providing a head for mounting on an elongate handle that has a sharpened blade edge for weed and root cutting, a slot adjacent the edge for conveying the cut weed and root stalks through the head, an edge formed with tines for breaking up the soil and for raking cut weed stalks aside, an earth pervious portion formed in the head adjacent the tines for permitting passage of soil therethrough but drawing the stalks and the like along with the movement so that such stalks can be cleared from the area to be planted. The tool also has a number of protuberances extending from a flat surface of the head which serve to pulverize and compact the soil when the soil is tamped with that surface.

A feature and advantage of the present invention is that only one tool need be procured to prepare soil for planting. This has an obvious cost advantage as well as expediting soil preparation in that the alternate use of two or more separate tools and the consequent wasted time are elimniated.

Another feature and advantage of this invention is that the tool can be rapidly and inexpensively constructed since it is formed in one piece of sheet material, such as steel.

These and other objects, features and advantages will be apparent from the following specification and attached drawing, in which:

FIG. 1 is a front view of the soil conditioning tool of the present invention;

FIG. 2 is a side view of the invention taken from the left side of FIG. 1;

FIG. 3 is a cross-sectional view taken along line 3—3 of FIG. 1;

FIG. 4 is a top view of the soil conditioning tool; and

FIG. 5 is a partial front view of the invention, showing a modification thereof.

Referring more particularly to the drawing, reference numeral 12 indicates generally the body of the head of my improved soil conditioning tool. One edge 14 of body 12 is sharpened to form a chopping blade on the body. The chopping blade is sloped back from body 12 at 16 to form a more convenient working angle for weed and root chopping operations. Formed in body 12 adjacent sharpened edge 14 is an elongate slot 18 through which chopped weeds and roots are conveyed to keep the chopping blade edge 14 clear of cut stalks.

Opposite sharpened edge 14 is an edge 20 from which extends a plurality of tines 22 each of which has at the extremity 24 thereof a sharpened portion to promote more efficient penetration of the soil by the tines. Body 12 is formed adjacent tines 22 with a soil pervious portion 26 that includes a plurality of holes 28 extending through the body. Holes 28 are sized to permit passage therethrough of soil but to block the conveyance of weed and root stalks through body 12. Therefore, clearing of a planting area of weed and root refuse is expedited by soil pervious portion 26 because pulverized soil passes through but weed stalks and refuse do not. In one tool constructed in accordance with my invention, holes 28 were formed by a ¾ in. diameter drill; such size was found suitable. Tines 22 slope back from a bending line 30 on the body to afford a more convenient raking angle.

From the rear surface of body 12 extends a tang 32 which can be threadably joined to the body, welded thereto, or otherwise suitably affixed. A handle 34 formed with axial hole 36 in one longitudinal end thereof is placed on tang 32 and a ferrule 38 circumscribing the end of handle 34 serves to securely bind the handle to the tang. It is to be understood that handle 34 can be any suitable length from approximately 12 in. for a tool used from a kneeling position.

Extending from the front face of body 12, the face opposite from that which tang 32 extends, are a plurality of protuberances 40. Each protuberance 40 has a generally sharpened or conical shaped end for pulverizing and compacting soil. As more clearly shown in FIG. 1, protuberances 40 extend from the spaces between adjacent holes 28 in soil pervious portion 26 of body 12.

The attachment of handle 34 to body 12 is secured by braces 42 that extend from a point 44 on handle 34 remote from opening 36 downwardly and outwardly to the rear face of body 12 on opposite sides of tang 32. Braces 42 are attached to body 12 by any suitable means such as threaded fasteners 46.

In conditioning soil with the device of my invention, weeds and root stalks are first cut and loosened from the soil by chopping the same with the chopping blade at edge 14. During the chopping procedure, cut stalks, loosened roots, and similar refuse pass through slot 18 so that the chopping blade is kept clear and unobstructed at all times. Moreover, any large pieces of soil can be broken up by chopping edge 14. When all weeds and roots have been loosened from the soil in the planting area the tool is turned over and tines 22 are drawn across the soil surface. Weeds, stalks and roots are moved along with the tool due to the presence of tines 22 and portion 26 which is impervious to the large roots and the like. Tines 22 further break up pieces of soil, and the fine particles then pass through holes 28. After a final smoothing operation by drawing tines 22 over the soil surface, the tool is then rotated 90° so that handle 34 is aligned generally vertically. Then tamping upon the soil surface effects compaction and additional pulverization of soil by the action of protuberances 40. Well known planting procedures are then carried out.

In soils that are extremely hard or have a high clay content I have found that the tines are preferably formed with a greater degree of sharpness. Referring to FIG. 5, the tines 22' on body 12 are formed generally conically shaped and have a sharp point 24'. The conical taper permits deeper and easier penetration of the tines into the soil. The remainder of the body 12 of FIG. 5 is identical, as that described above.

It is to be noted that my invention can be incorporated into soil conditioning tools of varying sizes. In one structure intended for use by an erect person, I have found that a body approximately 12 in. wide and about 7 in. high on a 60 in. handle is quite satisfactory. On the other hand, with tools for use by a kneeling person, a body having a width of from 4 to 5 in. and a handle from about 12 to 18 in. in length is preferable.

While one embodiment of my invention has been shown and described, it will be apparent that other adaptations and modifications may be made without parting from the true spirit and scope of the invention.

What is claimed is:

A tool head for conditioning soil and adapted to be attached to one end of an elongate handle, said tool head comprising a central planar body portion having first and second surfaces, means for mounting a handle to said first surface approximately normal thereto, a plurality of tines extending from one edge of said central body portion and formed integrally therewith, said body portion having a plurality of spaced apart holes therethrough intermediate said tines and said handle mounting means for forming a soil-pervious refuse-impervious area in said central body portion, a plurality of protuberances extending perpendicularly from said second surface of said body portion between said holes to define a pulverizing and compacting segment, a cultivator blade extending from an edge of said central body portion opposite said tines and integral with said central body portion, said body portion having an elongate slot therethrough intermediate said blade and said handle mounting means for providing a passage through said body to clear refuse from said blade, the first surface of said tool head being smooth intermediate said tines and said holes and intermediate said blades and said elongate slot to afford substantially unimpeded passage of material over said first surface.

References Cited in the file of this patent

UNITED STATES PATENTS

| | | |
|---|---|---|
| 332,350 | Kretsinger | Dec. 15, 1885 |
| 1,366,819 | Miller | Jan. 23, 1921 |
| 1,666,374 | Gatti | Apr. 17, 1928 |
| 2,797,628 | Schrag | July 2, 1957 |